United States Patent [19]

Janouch et al.

[11] Patent Number: 4,707,516

[45] Date of Patent: Nov. 17, 1987

[54] POLYMERIC SULFOXIDE BASED ON THE POLYMER OF VINYLALCOHOL

[75] Inventors: Václav Janouch, Prague; Hana Hrudková, Unhost; Pavel Cefelín, Prague, all of Czechoslovakia

[73] Assignee: Ceskoslovenskla akademie ved, Czechoslovakia

[21] Appl. No.: 892,484

[22] Filed: Aug. 1, 1986

[30] Foreign Application Priority Data

Aug. 9, 1985 [CS] Czechoslovakia .................... 5813-85

[51] Int. Cl.$^4$ ............................................. C08F 8/34
[52] U.S. Cl. ........................................ 525/60; 525/61
[58] Field of Search .................................. 525/60, 61

[56] References Cited

U.S. PATENT DOCUMENTS 3,031,435  4/1962  Tesoro ................................... 525/59
3,337,458  8/1967  Bauer .................................... 525/286

Primary Examiner—Christopher Henderson
Attorney, Agent, or Firm—Leydig, Voit & Mayer

[57] ABSTRACT

A polymeric sulfoxide based on a polymer or copolymer of vinyl alcohol is disclosed, as well as a method of producing it. Sulfoxide containing polymers are useful as catalysts, as membranes and to hold metal cations. Hydrophilic and hydrophobic characteristics can be varied over wide ranges.

The general formula for the polymeric sulfoxide of the invention is:

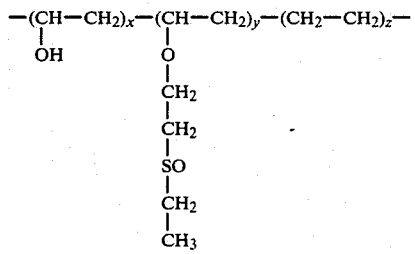

where x and y are both greater than 0, z=0–0.8, and x+y+z=1.

1 Claim, No Drawings

POLYMERIC SULFOXIDE BASED ON THE POLYMER OF VINYLALCOHOL

BACKGROUND OF THE INVENTION

1. Field

The invention pertains to a polymeric sulfoxide based on the polymer and copolymer of vinylalcohol and to a method of its preparation.

2. Description of Related Art

Polymers with sulfoxide units have been prepared and used as efficient catalysts in substitution reactions. /Janout V., Kahovec J., Hrudková H., Svec F., Cefelín P.: Polym. Bull. 11, 215 (1984); Janout V., Hrudková H., Cefelín P.: Collection Czech. Chem. Commun. 49, 2096-2102 (1984); Kondo S., Ohta K., Tsuda K.: Makromol. Chem., Rapid Commun. 4, 145 (1983)/. Complex-formation properties were found with these polymers. /Janout V., Hrudková H., Cefelín P.: Collection Czech. Chem. Commun. 50, 2431-2437 (1985)/. Their preparation starts with monomers which are either difficult to obtain or, which require one to work with carcinogens such as chloromethyl methyl ether for the production of chloromethylated poly(styrene-codivinylbenzene).

DESCRIPTION OF INVENTION

The subject of this invention is a polymeric sulfoxide based on the polymer and copolymer of vinylalcohol with the general formula I,

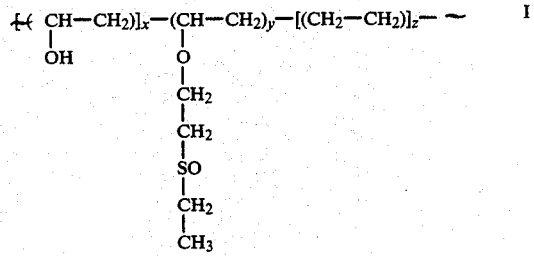

where $x+y+z=1$ and $z=0-0.8$.

According to the invention a method for the preparation of a polymeric sulfoxide, based on the polymer and copolymer of vinylalcohol, consists in allowing poly(vinylalcohol) or poly(vinylalcohol-co-ethylene) to react with vinylethylsulfoxide in the medium of dimethylformamide /DMF/ or dimethylsulfoxide /DMSO/ in the presence of a base selected from the group comprising potassium tert-butoxide, potassium methylsulfinylmethide /KCH$_2$SOCH$_3$/, and pyridine at temperature 25° to 70° C. and, if it is desirable, in the presence of a crosslinking agent.

The polymeric sulfoxides according to the invention may be soluble or insoluble depending on their degree of crosslinking.

1,ω-Dibromoalkanes with $\omega=5$ to 12 are used as the crosslinking components according to the invention.

Insoluble polymeric sulfoxides based on poly(vinylalcohol) may be prepared according to the invention in such a way, that poly(vinylalcohol) is first allowed to react with vinylethylsulfoxide in the presence of potassium methylsulfinylmethide and then with 1,ω-dibromoalkane in the presence of pyridine.

It is also possible to proceed by the method according to the invention so that the insoluble copolymer poly(vinylalcohol-co-ethylene) is allowed to react with vinylethylsulfoxide in the medium of dimethylsulfoxide and in the presence of potassium tert-butoxide.

Polymers with various numbers of sulfinyl groups can be prepared by the method according to the invention, while the degree of crosslinking may be controlled by the amount of 1,ω-dibromoalkane. In the reaction according to the invention, the sulfoxide groupings are bonded to polymeric chains through oxygen bridges and their content may be varied by the ratio and concentration of all reaction components and the type of employed base.

An advantage of the method for preparation according to the invention is the character of the starting polymer, which enables the formation of a polymer containing sulfoxide units in addition to further heteroatoms, variation of hydrophilic, hydrophobic and affinity interactions within broad limits.

The polymers with sulfoxide units are used as catalysts of organic reactions, for trapping of metal cations and as membranes.

The following examples are intended to characterize the invention without, however, limiting its scope by any means.

EXAMPLE 1

To 0.050 g /1.10 mmol/ of poly(vinylalcohol) /$\overline{M}_n=128,000$/ dissolved in 1.25 ml of dimethylformamide /DMF/, it was added, under stirring and in the atmosphere of argon, 0.080 g /0.7 mmol/ of potassium tert-butoxide and then 0.53 ml of 4M solution of vinylethylsulfoxide /2.2 mmol/ in DMF. The reaction mixture was stirred at 70° C. for 46 h, then cooled to laboratory temperature, and 0.3 ml of water was added. The modified poly(vinylalcohol) was precipitated into ether and purified by dissolution in ethanol and reprecipitation. This procedure was repeated twice. The polymer contained after drying 11.5 wt.% of sulfur, which corresponds to the conversion of hydroxyl groups 29% /$y=0.29$, $z=0$/.

EXAMPLE 2

To 0.20 g of the previously crosslinked poly(vinylalcohol-co-ethylene), containing 38 mol.% of vinylalcohol units, in 4 ml of dimethylsulfoxide, it was added under stirring first 0.85 ml /0.85 mmol/ of dimethylsulfoxide solution of potassium tert-butoxide and then 0.32 ml /3.42 mmol/ of vinylethylsulfoxide. The reaction mixture was stirred at 70° C. for 115 hours. The copolymer was then washed with 1,4-dioxan, heptane and ether and dried. The content of sulfur in the copolymer was 2.7 wt.%, which corresponds to the conversion of hydroxyl groups 8.2 wt.%. The copolymer, used as a solid cosolvent in the reaction of sodium phenoxide with 1-bromooctane, exhibited the 15-times higher catalytic activity than the polymeric analogue of dimethylsulfoxide based on poly(styrene-co-divinylbenzene) /$x=0.38$, $y=0.03$, $z=0.59$/.

EXAMPLE 3

To 0.1 g /2.2 mmol/ of poly(vinylalcohol) /$\overline{M}_n=128,000$/ dissolved in 4 ml of dimethylsulfoxide, it was added under stirring 1.12 ml of 1M solution of potassium methylsulfinylmethide /KCH$_2$SOCH$_3$/ and then 0.43 ml of vinylethylsulfoxide /4.6 mmol/. The reaction mixture was stirred at 50° C. for 48 hours. Then was added 0.069 g /0.87 mmol/ of pyridine and 0.140 g /0.5 mmol/ of 1,8-dibromooctane and the mixture was allowed at 70° C. for 250 hours. The crosslinked polymer was washed with ethanol and 1,4-dioxane and dried. The content of sulfur was 11.1 wt.%, which corresponds to the conversion of hydroxyl groups 26% /y=0.26, z=0/.

What is claimed is:

1. A polymeric sulfoxide based on a polymer or copolymer of vinylalcohol, said polymeric sulfoxide having the formula I,

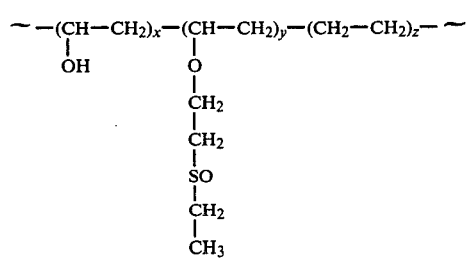

where x and y are both greater than 0, z=0–0.8, and $x+y+z=1$.